UNITED STATES PATENT OFFICE.

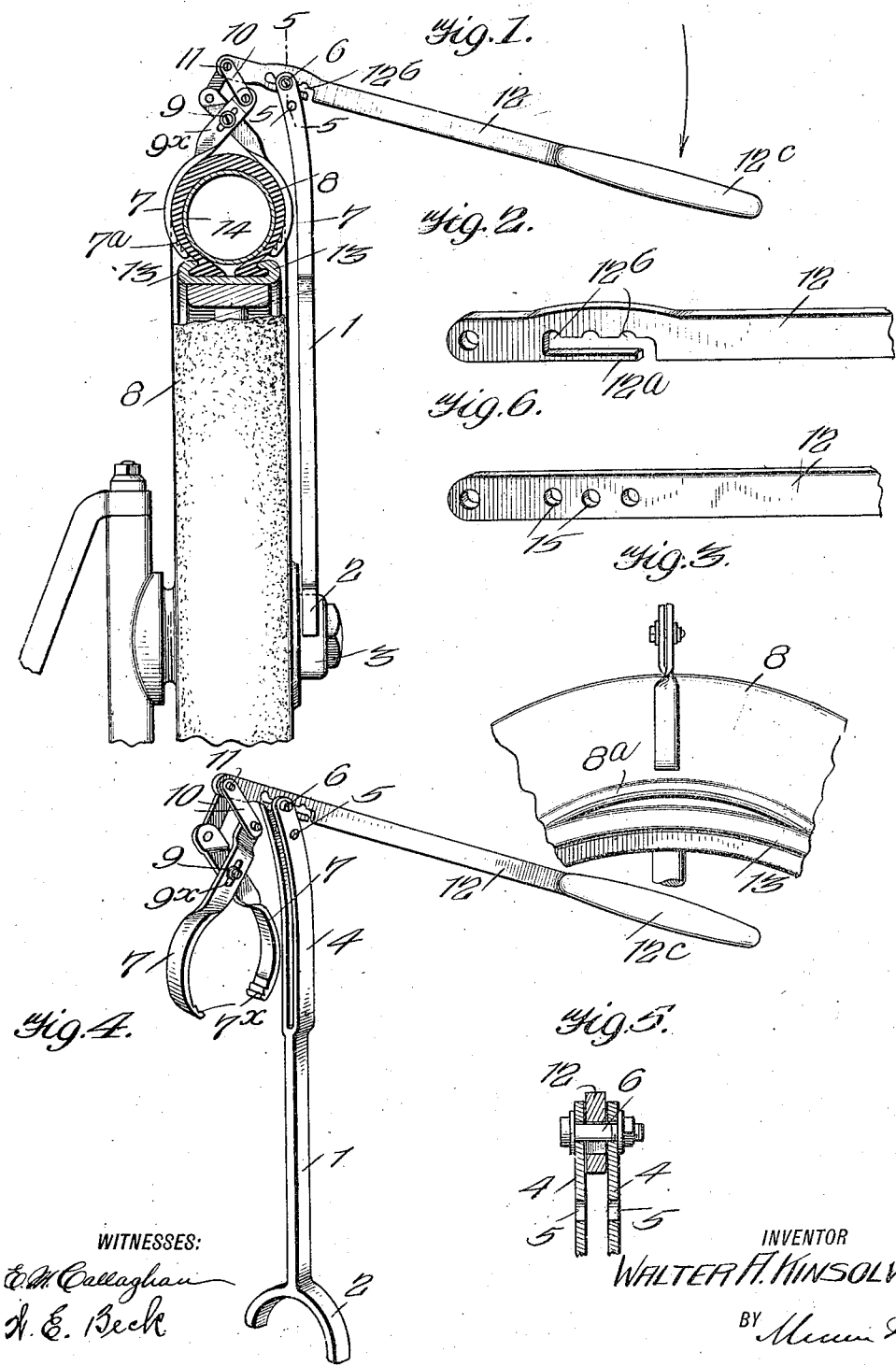

WALTER A. KINSOLVING, OF WASHINGTON, DISTRICT OF COLUMBIA.

TIRE-TOOL.

1,217,777.  Specification of Letters Patent.  Patented Feb. 27, 1917.

Application filed January 25, 1915. Serial No. 4,290.

*To all whom it may concern:*

Be it known that I, WALTER A. KINSOLVING, a citizen of the United States, and a resident of the city of Washington, in the District of Columbia, have invented a certain new and useful Improvement in Tire-Tools, of which the following is a specification.

My invention relates to improvements in tire tools, and it consists in the combinations, constructions, and arrangements herein described and claimed.

An object of my invention is to provide a device by means of which the removal or replacement of a pneumatic tire may be easily effected.

A further object of my invention is to provide a simple tool, consisting substantially of two parts, which can be instantly assembled and very readily taken apart so as to go into the tool kit.

A further object of my invention is to provide a tool of the type described which consists of a gripping member pivotally mounted at the upper end of a standard, the lower end of the standard being shaped to conform with the hub cap of the ordinary automobile wheel, so that the latter may act as a support for the tool.

Other objects and advantages will appear in the following specification and the novel features of the invention will be particularly pointed out in the appended claims.

My invention is illustrated in the accompanying drawings forming part of this application, in which—

Figure 1 is a side view of the device showing its application to a tire, a portion of the tire being shown in section, Fig. 2 is a perspective view of one end of the operating lever, Fig. 3 is a side view of a portion of the wheel, showing the tire lifted from the rim, Fig. 4 is a perspective view of the tool, Fig. 5 is a section along the line 5—5 of Fig. 1, and Fig. 6 is a modified form of the operating lever.

In carrying out my invention, I provide a standard 1 having an arc shaped base 2 arranged to straddle the hub cap 3 of an automobile wheel. The top part of the standard 1 is preferably forked as shown at 4, the arms of the fork being provided at their upper ends with openings 5. In the drawings I have shown two of these openings, but it will be understood that more might be provided. A pivot pin or bolt, such as that shown at 6, is arranged to extend through the openings 5 in the opposed arms 4.

The gripping portion of the tool comprises two members 7 which are curved to conform to the curvature of the tires 8, the ends of the members 7 being corrugated or provided with teeth $7^x$ as clearly shown in Fig. 4. The members 7 are pivotally connected together at 9 by a pivot pin which is carried by one of the members and which projects through a slot $9^x$ in the other. The ends of the members 7 are connected by links 10 to a common pivot pin 11 which passes through the operating lever 12.

The lever 12 is provided with a slot $12^a$ like that shown in Fig. 2, having recesses $12^b$ communicating with the slot and arranged to receive the pin 6.

From the foregoing description of the various parts of the device, the operation thereof may be readily understood.

In assembling the parts, the pin 6 in the standard is inserted in the slot $12^a$ and pushed forwardly until it comes into registration with one of the slots or recesses $12^b$. The gripping members 7 are forced apart and now placed around the tire 8. The standard 1 is now brought into position over the hub cap 3.

Downward pressure on the handle $12^c$ of the operating lever 12 will cause the gripping members 7 to engage the outer casing of the tire 8 in the manner shown in Fig. 1. Further movement of the lever will cause the gripping members 7 to move inwardly and at the same time upwardly. The inward movement of the ends of the gripping members will free the bead $8^a$ of the tire from the rim 13 of the wheel, while the upward movement will pull the tire into the position shown in Fig. 3. From this figure it will be seen that there is a space between the bead $8^a$ of the tire and the rim 13 so that a tire removing tool may now be thrust in between the rim 13 and the bead $8^a$ from side to side of the rim.

Now, by easing up a little bit on the lever 12 and shifting the latter to the right or left, as the case may be, the tool may be moved to another position along the tire, because the standard 1 will move with the lever, and the gripping member 7 will also move so that without removing the standard from the hub or the gripping members from the tire, the tool may be shifted to another position. The operation of the tool in the second position is the same as in the first position. The tire is lifted until a tire iron may be shoved through the space between the tire and the rim.

I have spoken of the operation of the tool in connection with heavy or stiff tires. Where the tires are lighter, the operation of the tool serves not only to push the bead $8^a$ free from the rim 13, then to lift the tire, but by pulling on the handle $12^c$ longitudinally of the lever 12, the tire may be brought over the rim and into a position from which it can be easily removed from the wheel by the ordinary method.

This tool can also be used for replacing a tire. The most difficult operation of replacing a tire is to stretch the outer casing over the last foot or so of the circumference of the wheel or rim. This may be done by placing the tool on the hub, gripping the tire by pressing downwardly on the lever, pushing on the lever to bring the tire over the rim, raising of the lever to permit the tire to enter into its normal position on the wheel.

One of the advantages of the use of this tool is, that the inner tire or tube 14, which is so apt to be injured by the use of the ordinary tire iron, is never in any danger of being injured, because the tool will lift both the inner and outer tube free from the rim so that the tire iron can be freely placed between the rim and the tire.

The provision of the plurality of recesses $12^d$ enables one to quickly change the leverage at will.

The standard 1 may be removed from the lever 12 by slipping the pin 6 out of the slot $12^a$ when the parts may be conveniently stored in the tool box.

In Fig. 6 I have shown a modified form of the lever 12. In this form there are openings 15 which correspond to the recesses $12^d$ and through any one of which the pin 6 is designed to extend. This form is preferable where the device is to be used only in the garage, since the stem prevents the standard 1 from becoming separated from the lever 12.

I claim:—

1. A tire tool having a standard provided with an arc-shaped base adapted to fit the hub cap of a wheel, a lever pivotally connected to said standard at one end thereof, and a pair of gripping members curved to conform to the curvature of a pneumatic tire pivotally connected with said lever.

2. In a tire tool, a standard having an arc-shaped base curved to conform to the curvature of the hub cap of a wheel, a lever pivotally connected at one end of said standard, a pair of curved gripping members pivotally connected together, and links connecting said curved gripping members with said lever.

3. A tire tool comprising a standard having a base curved to conform to the curvature of the hub cap of a wheel, a lever pivotally connected to said standard at the upper end thereof, a pair of links pivotally connected to one end of said lever, a curved gripping member provided with a slot pivotally connected to one of said links, a second curved gripping member pivotally connected to the other links, and a pivot pin carried by one of said gripping members and arranged to project through the slot in the other gripping member.

4. A tire tool comprising a standard having a forked end and being provided with a base curved to conform to the curvature of the hub cap of a wheel, a lever having an L-shaped slot provided with laterally extending recesses, a pivot pin carried by the forked end of said standard and arranged to enter said slot and any of said laterally extending recesses, a curved gripping member having a slot, a second curved gripping member provided with a pivot pin arranged to enter the slot in the first-named gripping member, and a link for pivotally connecting each of said gripping members with one end of said lever.

WALTER A. KINSOLVING.

Witnesses:
L. A. STANLEY,
SOLON C. KEMON.